(12) United States Patent
Wu

(10) Patent No.: US 7,063,425 B2
(45) Date of Patent: Jun. 20, 2006

(54) COLOR WHEEL

(75) Inventor: Ting-Chiang Wu, Dong-Guan (CN)

(73) Assignee: Asia Optical Co., INC, Taichung (TW)

( * ) Notice: Subject to any disclaimer, the term of this patent is extended or adjusted under 35 U.S.C. 154(b) by 19 days.

(21) Appl. No.: 10/887,435

(22) Filed: Jul. 8, 2004

(65) Prior Publication Data

US 2005/0168709 A1 Aug. 4, 2005

(30) Foreign Application Priority Data

Jan. 30, 2004 (TW) .............................. 93102181 A

(51) Int. Cl.
*G03B 21/14* (2006.01)
*G02B 5/22* (2006.01)
*G02B 7/00* (2006.01)

(52) U.S. Cl. ........................ 353/84; 353/119; 348/743; 359/891; 359/892

(58) Field of Classification Search ........ 359/889–892; 353/84, 30, 119, 122; 348/742, 743; 434/101–104; 362/293
See application file for complete search history.

(56) References Cited

U.S. PATENT DOCUMENTS

| | | | |
|---|---|---|---|
| 4,076,393 A * | 2/1978 | Bates | 359/892 |
| 6,598,977 B1 * | 7/2003 | Chen | 353/31 |
| 6,715,887 B1 * | 4/2004 | Chang | 353/84 |
| 6,755,554 B1 * | 6/2004 | Ohmae et al. | 362/293 |
| 6,769,775 B1 * | 8/2004 | Chin et al. | 353/84 |
| 6,914,734 B1 * | 7/2005 | Kao et al. | 359/892 |
| 2004/0233279 A1 * | 11/2004 | Chang et al. | 348/125 |
| 2005/0122485 A1 * | 6/2005 | Kao et al. | 353/84 |
| 2005/0168857 A1 * | 8/2005 | Lee et al. | 359/892 |

\* cited by examiner

*Primary Examiner*—W. B. Perkey
*Assistant Examiner*—Andrew Sever
(74) *Attorney, Agent, or Firm*—Merchant & Gould P.C.

(57) ABSTRACT

A color wheel includes a carrier having a carrier surface, a color filter plate unit mounted coaxially on the carrier surface and having at least one first through hole, a press cover for covering the color filter plate unit, and a fixing unit. The press cover has at least one second through hole corresponding in position to the first through hole. The fixing unit extends through the first and second through holes, and is fixed to the carrier so as to position the color filter plate unit on the carrier.

5 Claims, 6 Drawing Sheets

COLOR WHEEL

CROSS-REFERENCE TO RELATED APPLICATION

This application claims priority of Taiwanese Application No. 093102181, filed on Jan. 30, 2004.

BACKGROUND OF THE INVENTION

1. Field of the Invention

The invention relates to a color wheel, more particularly to a color wheel for an optical projection device in which a color filter plate unit is assembled with a rotary carrier without the need for an adhesive layer between the carrier and the color filter plate unit.

2. Description of the Related Art

Referring to FIGS. 1 and 2, a conventional color wheel is mounted on a motor (not shown), and has a carrier 1 fixed on the motor and having a carrier surface 101, and a plurality of filter segments 2 that are adhered to the carrier surface 101. When the motor drives the carrier 1 and the filter segments 2 to rotate at a high speed, light beams projected from a light source (not shown) can pass through the filter segments 2 so as to produce an image.

Although the conventional color wheel can achieve its intended purpose, in actual production, it has the following disadvantages:

1. The filter segments 2 are adhered to the carrier surface 101 of the carrier 1 through an adhesive layer 3. When the adhesive layer 3 is spread on the carrier surface 101, uneven spreading of the adhesive layer 3 on the carrier surface 101 is likely to occur such that rotational imbalance of the conventional color wheel is encountered during rotation. Furthermore, the adhesive layer 3 can increase the thickness of the carrier surface 101 of the carrier 1.

2. Since the carrier 1 is fixed to the motor, and since the filter segments 2 are adhered to the carrier surface 101 of the carrier 1, when the whole assembly has defects, such as assembly inaccuracy and incorrectable rotational imbalance, the conventional color wheel does not permit partial replacement of component parts such that the whole assembly, including the motor, has to be discarded. As a result, not only is there a waste of components, but the production cost is increased as well.

SUMMARY OF THE INVENTION

Therefore, the object of the present invention is to provide a color wheel that can overcome the aforesaid drawbacks of the prior art.

According to this invention, a color wheel comprises a carrier having a carrier surface, a color filter plate unit, a press cover, and a fixing unit. The color filter plate unit is mounted coaxially on the carrier surface, and has at least one first through hole. The press cover is for covering the color filter plate unit, and has at least one second through hole corresponding in position to the first through hole. The fixing unit extends through the first and second through holes, and is fixed to the carrier so as to position the color filter plate unit on the carrier.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
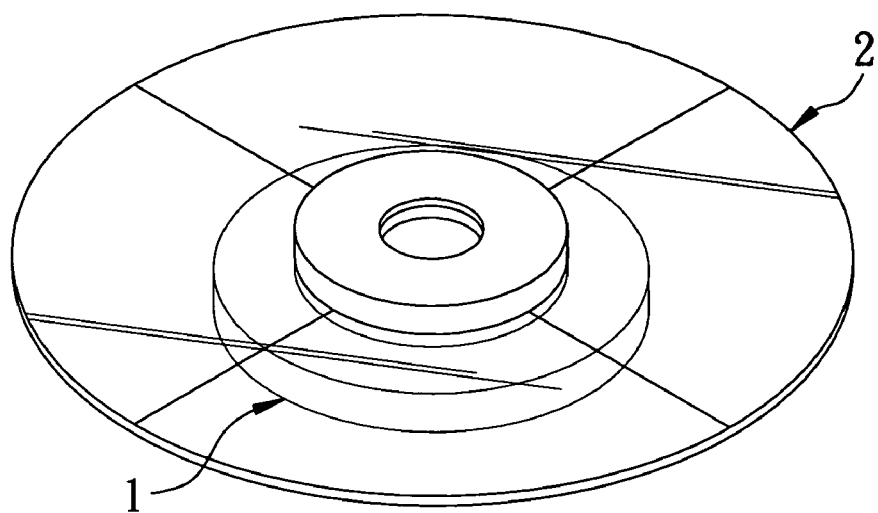
FIG. 1 is a perspective view of a conventional color wheel.

Before the present invention is described in greater detail, it should be noted that like elements are denoted by the same reference numerals throughout the disclosure.

Figure 3:
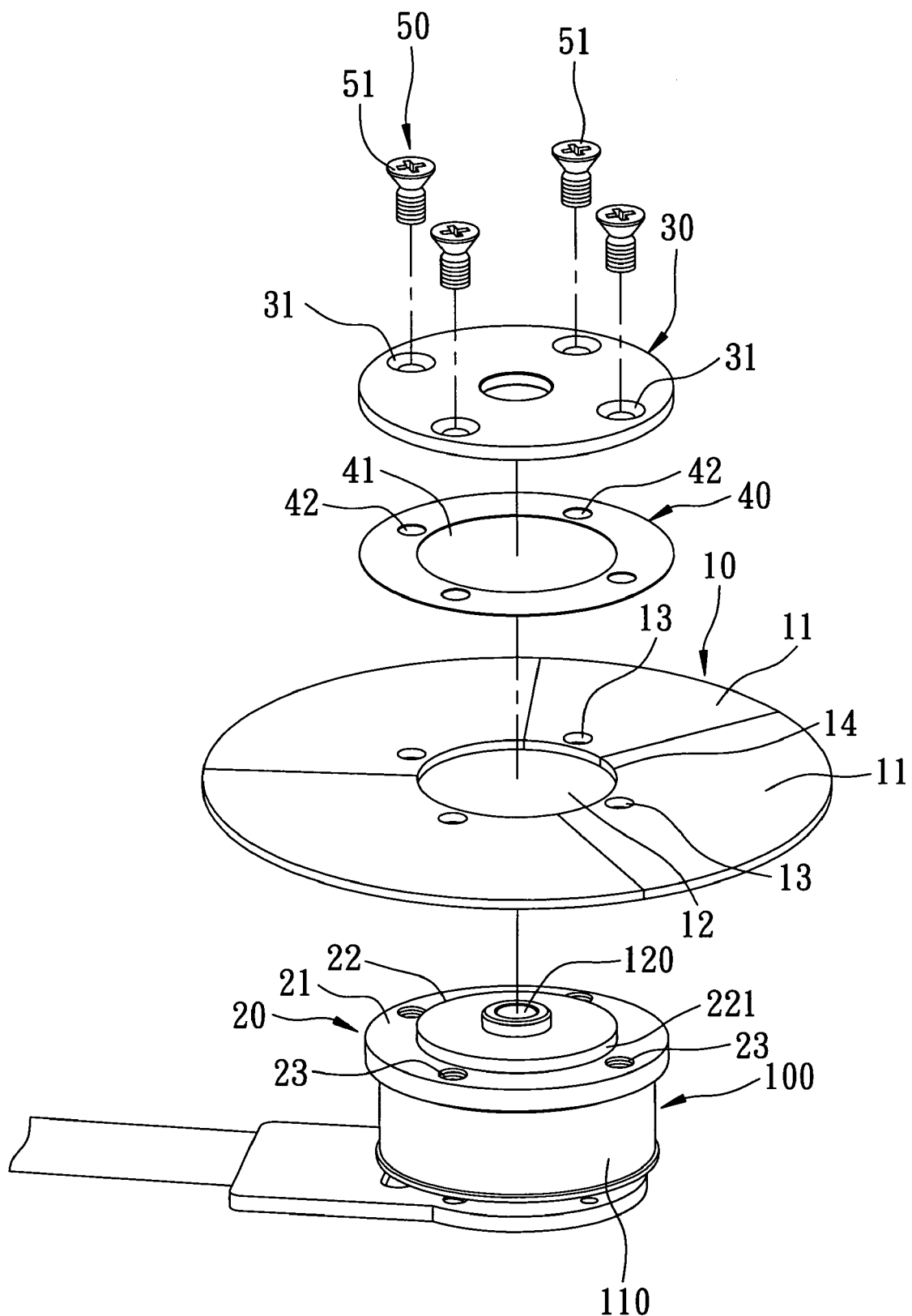
FIG. 3 is an exploded perspective view of the first preferred embodiment of a color wheel according to the present invention.
Figure 4:
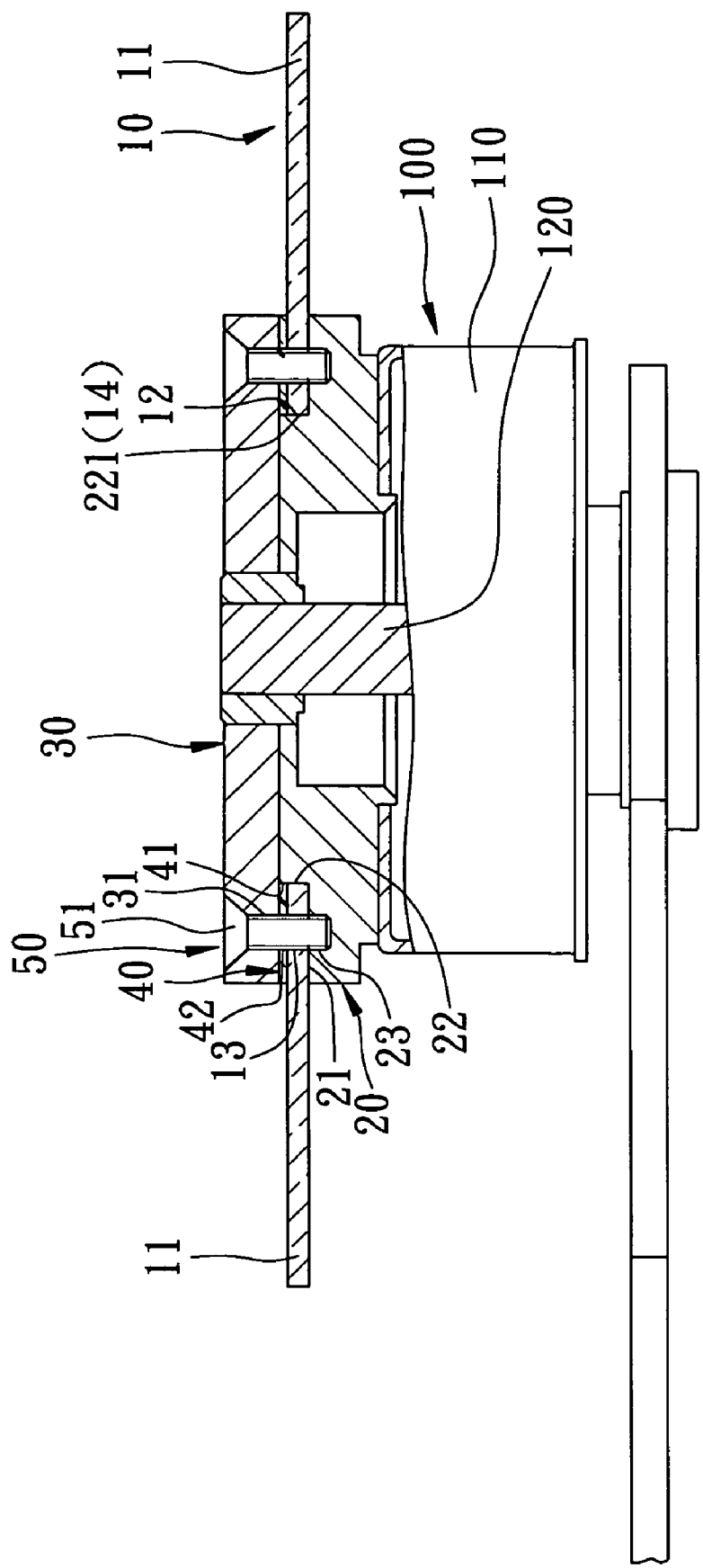
FIG. 4 is a partly sectional view of the first preferred embodiment in an assembled state.

Referring to FIGS. 3 and 4, the first preferred embodiment of a color wheel according to the present invention is adapted to be mounted on a drive unit, and is shown to comprise a color filter plate unit 10, a carrier 20, a press cover 30, a packing ring 40, and a fixing unit 50. The drive unit is a motor 100 including a rotary hub 110 and a rotary shaft 120.

The color filter plate unit 10 includes a plurality of annularly arranged filter segments 11 that are connected to define a central hole 12, an inner periphery 14 extending around the central hole 12, and a plurality of first through holes 13, each of which is formed in a respective one of the filter segments 11.

The carrier 20 is mounted on and is rotatable with the rotary hub 110 and the rotary shaft 120. The carrier 20 includes a carrier surface 21, a central boss 22 extending axially and upwardly from the carrier surface 21, and a plurality of positioning holes 23 formed in the carrier surface 21 and aligned axially with the first through holes 13. The outer diameter of the central boss 22 is nearly equal to the diameter of the central hole 12. When the filter segments 11 are mounted coaxially on the carrier surface 21, the central boss 22 extends through the central hole 12, and the inner periphery 14 of the color filter plate unit 10 abuts against an outer peripheral face 221 of the central boss 22. In this embodiment, each of the positioning holes 23 is a screw hole.

The press cover 30 is formed as a circular plate for covering the color filter plate unit 10, and has a plurality of second through holes 31 corresponding in position to and aligned axially with the first through holes 13.

The packing ring 40 is clamped between a bottom face of the press cover 30 and a top face of the color filter plate unit 10. The packing ring 40 has a central hole 41, and a plurality of third through holes 42 aligned axially with the first through holes 13. The diameter of the central hole 41 is nearly equal to the outer diameter of the central boss 22 so as to permit extension of the central boss 22 therethrough. The outer diameter of the packing ring 40 is nearly equal to the outer diameter of the carrier surface 21.

The fixing unit 50, in this embodiment, includes a plurality of screws 51.

When the color filter plate unit 10, the packing ring 40, and the press cover 30 are mounted consecutively on the carrier 20, the screws 51 are passed through the respective second through holes 31, the respective third through holes 42, and the respective first through holes 13, and engage threadedly and respectively the positioning holes 23 in the carrier surface 21. As such, the press cover 30 presses tightly the filter segments 11 against the carrier surface 21 through the packing ring 40, thereby positioning the color filter plate unit 10 on the carrier 20.

When the motor 100 is actuated, through the rotary hub 110 and the rotary shaft 120, the carrier 10 and the filter segments 21 are rotated at a high speed so that light beams projected from a light source (not shown) can pass through the filter segments 11 so as to produce an image.

Figure 2:
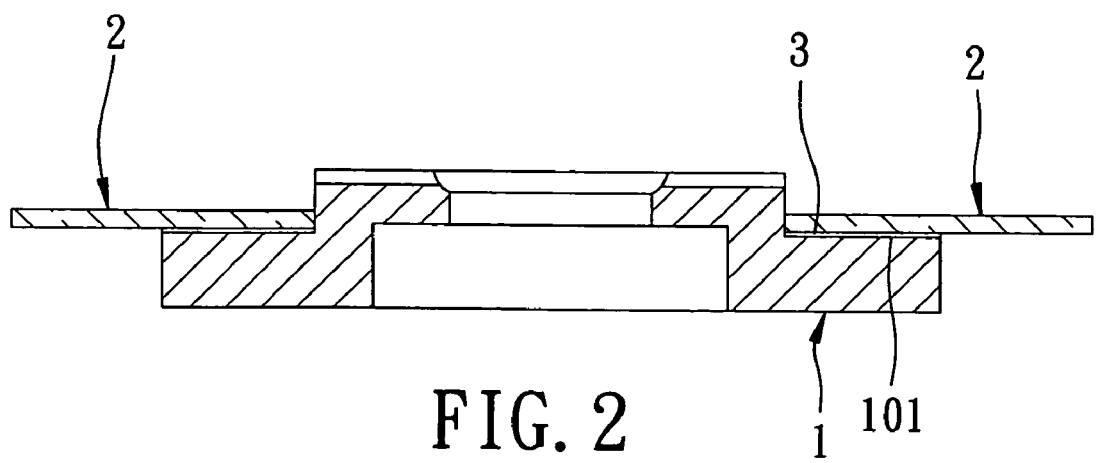
FIG. 2 is a sectional view of the conventional color wheel of FIG. 1.

From the aforementioned description of the first preferred embodiment, some of the advantages of the present invention can be summarized as follows:

1. The screws 51 are connected threadedly to the carrier 20 so as to position securely the filter segments 11 on the carrier 20 such that the present invention will not encounter the problems met in the conventional color wheel, such as a rotational imbalance due to uneven spreading of the adhesive layer 3 (see FIG. 2). Furthermore, the thickness of the carrier surface 21 is maintained.

2. The filter segments 11 are positioned securely on the carrier surface 21 of the carrier 20 by the press cover 30 and the packing ring 40 through threaded engagement of the screws 51 with the carrier surface 21. When the quality of the whole assembly of the present invention is defective, the screws 51 can be loosened so as to remove the defective component, such as the filter segments 11, the press cover 30, or the packing ring 40, for replacement with a new one. Thus, the present invention not only permits partial replacement of the defective components, but also allows continued use of the motor 100, thereby effectively minimizing the production costs.

Figure 5:
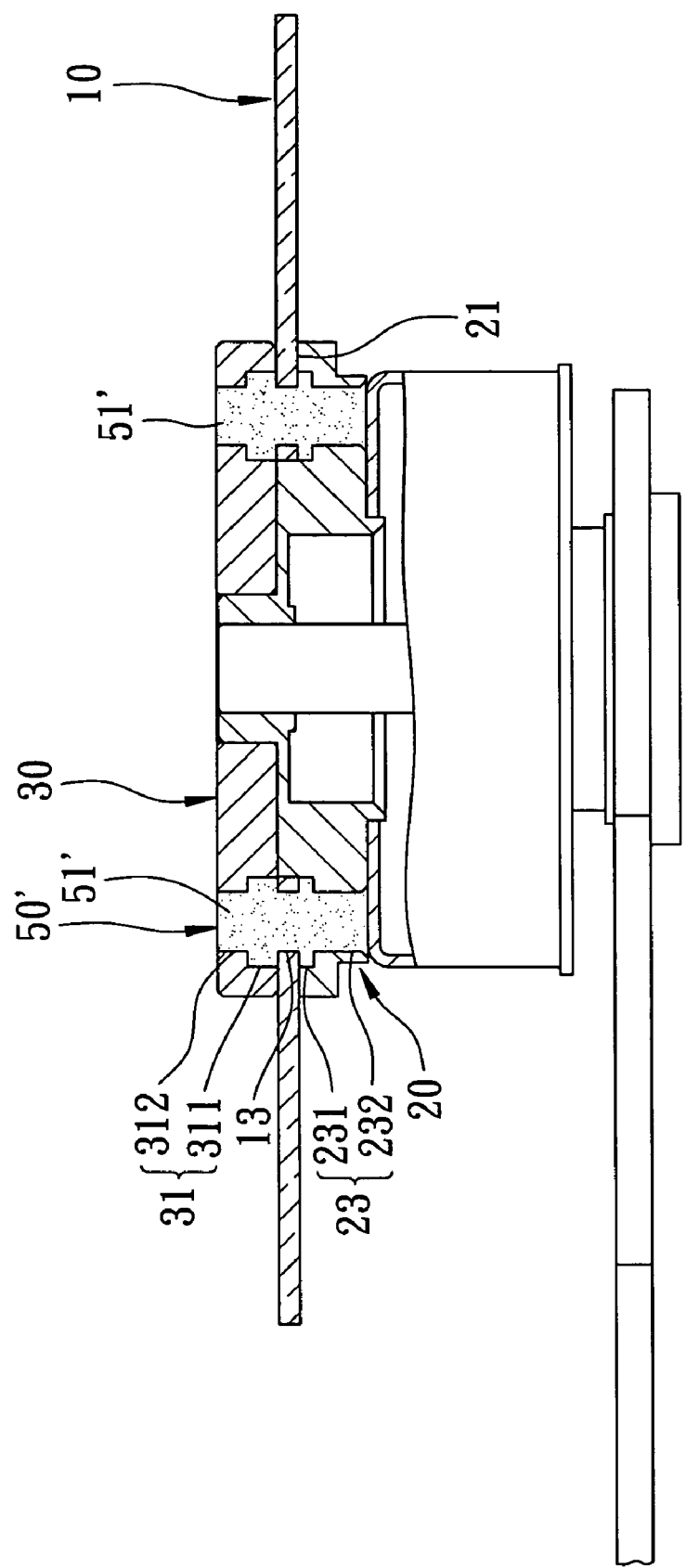
FIG. 5 is a partly sectional view of the second preferred embodiment of a color wheel according to the present invention in an assembled state.

Referring to FIG. 5, the second preferred embodiment of a color wheel according to the present invention is shown to be substantially similar to the first preferred embodiment. However, in this embodiment, each of the positioning holes 23 in the carrier surface 21 includes a large diameter hole section 231 extending inwardly from the carrier surface 21, and a small diameter hole section 232 extending from and in spatial communication with the large diameter hole section 231. Each of the second through holes 31 in the press cover 30 includes a large diameter hole section 311 extending inwardly from a bottom face of the press cover 31, and a small diameter hole section 312 extending from and in spatial communication with the large diameter hole section 311. The fixing unit 50' includes a plurality of anchoring elements 51' of adhesive material. Each of the anchoring elements 51' is formed in situ in the respective second through hole 31, in the respective first through hole 13, and in the respective positioning hole 23 after the color filter plate unit 10 and the press cover 30 are mounted consecutively on the carrier 20. The press cover 30 and the color filter plate unit 10 are therefore adhered to the carrier surface 21 of the carrier 20. Thus, in comparison with the conventional color wheel, the present invention can avoid rotational imbalance due to uneven spreading of the adhesive, and does not increase the thickness of the carrier surface 21.

Figure 6:
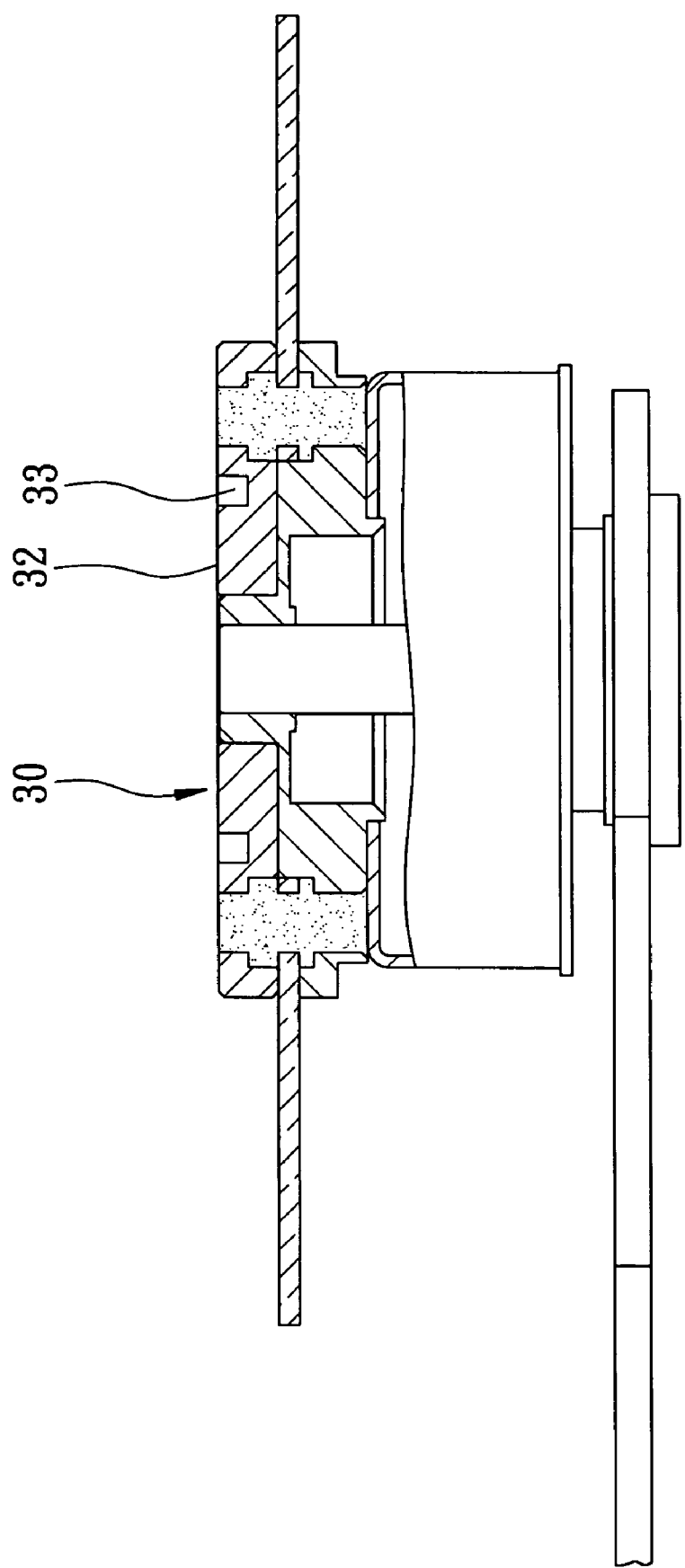
FIG. 6 is a partly sectional view of the third preferred embodiment of a color wheel according to the present invention in an assembled state.

Referring to FIG. 6, the third preferred embodiment of a color wheel according to the present invention is shown to be substantially similar to the second preferred embodiment. However, in this embodiment, the press cover 30 has a top face 32, and a plurality of counterweight grooves 33 formed in the top face 32. If a rotational imbalance occurs during rotation of the color wheel of the present invention, counterweight elements, such as clay or resin (not shown), may be filled into the counterweight grooves 33.

Figure 7:
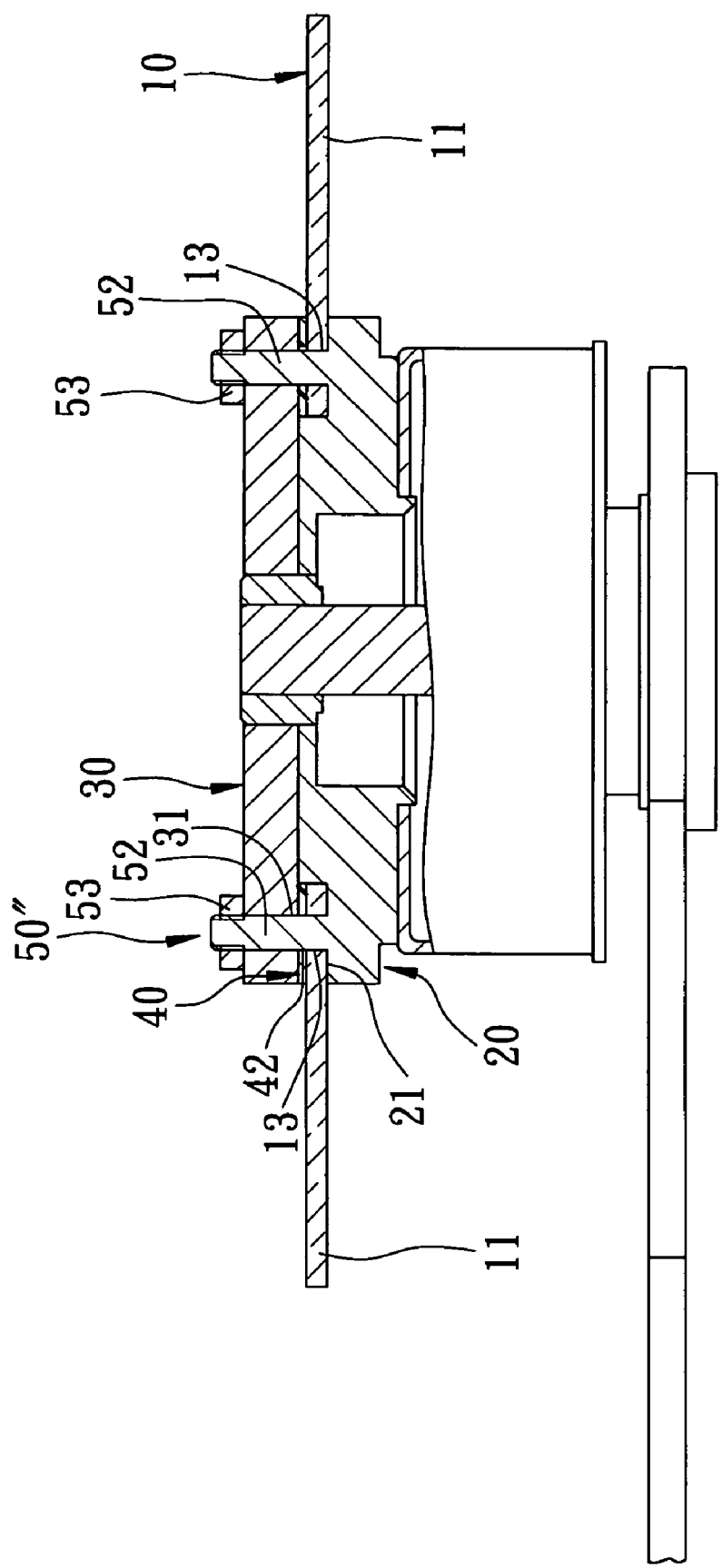
FIG. 7 is a partly sectional view of the fourth preferred embodiment of a color wheel according to the present invention in an assembled state.

Referring to FIG. 7, the fourth preferred embodiment of a color wheel according to the present invention is shown to be substantially similar to the first preferred embodiment. However, in this embodiment, the fixing unit 50" includes a plurality of positioning posts 52 extending upwardly from the carrier surface 21, and a plurality of nuts 53 to engage threadedly and respectively the positioning posts 52. The positioning posts 52 extend respectively through the first through holes 13, the third through holes 42, and out of the second through holes 31 so as to engage threadedly the nuts 53. As such, the press cover 30 presses tightly the filter segments 11 against the carrier surface 21 through the packing ring 40, thereby positioning the color filter plate unit 10 on the carrier 20. Thus, the advantages of the first preferred embodiment can be similarly attained using the fourth preferred embodiment of this invention.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A color wheel comprising:
a carrier having a carrier surface;
a color filter plate unit mounted coaxially on said carrier surface and having at least one first through hole;
a press cover for covering said color filter plate unit, and having at least one second through hole corresponding in position to said first through hole; and
a fixing unit that extends through said first and second through holes and that is fixed to said carrier so as to position said color filter plate unit on said carrier;
wherein said carrier further has at least one positioning hole formed in said carrier surface, said fixing unit extending consecutively through said second through hole and said first through hole, and engaging said positioning hole;
wherein said color filter plate unit has a plurality of said first through holes, and is formed by a plurality of annularly arranged filter segments that are connected to define a central hole, said first through holes being formed respectively in said filter segments, said carrier having a plurality of said positioning holes formed in said carrier surface and aligned axially with said first through holes, said press cover having a plurality of said second through holes aligned axially with said first through holes; and
wherein each of said positioning holes includes a large diameter hole section and a small diameter hole section, each of said second through holes including a large diameter hole section and a small diameter hole section, said fixing unit including a plurality of anchoring elements of adhesive material, each of which is formed in situ in one of said second through holes, one of said first through holes, and one of said positioning holes.

2. The color wheel as claimed in claim 1, wherein said carrier further has a central boss extending axially and upwardly from said carrier surface and extending through said central hole.

3. The color wheel as claimed in claim 2, further comprising a packing ring that is clamped between said press cover and said color filter plate unit.

4. The color wheel as claimed in claim 3, wherein said packing ring has a plurality of third through holes aligned axially with said first through holes, said fixing unit including a plurality of screws, each extending through one of said second through holes, one of said third through holes, and one of said first trough holes, and engaging one of said positioning holes in said carrier.

5. The color wheel as claimed in claim 1, wherein said press cover has a top face and an annular counterweight groove formed in said top face.

* * * * *